(12) United States Patent
Gronvold

(10) Patent No.: US 11,268,646 B2
(45) Date of Patent: Mar. 8, 2022

(54) BENDING RESTRICTOR

(71) Applicant: NEXANS, Courbevoie (FR)

(72) Inventor: Eirik Gronvold, As (NO)

(73) Assignee: NEXANS, Courbevoie (FR)

( * ) Notice: Subject to any disclaimer, the term of this patent is extended or adjusted under 35 U.S.C. 154(b) by 17 days.

(21) Appl. No.: 16/397,533

(22) Filed: Apr. 29, 2019

(65) Prior Publication Data

US 2020/0116292 A1  Apr. 16, 2020

(30) Foreign Application Priority Data

May 3, 2018 (EP) ................... 18 305 554.0

(51) Int. Cl.

| F16L 57/02 | (2006.01) |
| F16L 1/12 | (2006.01) |
| B29L 23/00 | (2006.01) |
| E21B 17/01 | (2006.01) |
| F16L 1/20 | (2006.01) |
| F16L 35/00 | (2006.01) |

(52) U.S. Cl.
CPC .............. *F16L 57/02* (2013.01); *F16L 1/123* (2013.01); *B29L 2023/22* (2013.01); *E21B 17/017* (2013.01); *F16L 1/20* (2013.01); *F16L 35/00* (2013.01)

(58) Field of Classification Search
CPC ......... F16L 11/18; F16L 57/02; E21B 17/017
USPC ........ 138/110, 120, 155, 109, 157; 285/223, 285/405
See application file for complete search history.

(56) References Cited

U.S. PATENT DOCUMENTS

| 1,822,624 | A | * | 9/1931 | Hoeftmann | ............ | H02G 9/065 |
| | | | | | | 285/154.3 |
| 5,143,123 | A | * | 9/1992 | Richards | ................. | F16L 11/18 |
| | | | | | | 138/110 |
| 5,197,767 | A | * | 3/1993 | Kimura | .................... | F16G 13/10 |
| | | | | | | 138/120 |
| 5,458,441 | A | * | 10/1995 | Barry | ........................ | F16L 1/12 |
| | | | | | | 138/107 |
| 6,279,617 | B1 | * | 8/2001 | Havn | ...................... | F16L 58/00 |
| | | | | | | 138/155 |
| 6,682,103 | B1 | * | 1/2004 | Poirier | ..................... | H02G 9/02 |
| | | | | | | 285/146.1 |
| 9,163,463 | B2 | * | 10/2015 | Smith | ..................... | F16L 35/00 |

(Continued)

FOREIGN PATENT DOCUMENTS

| CN | 206 889 963 | 1/2018 |
| WO | 2010136801 | 12/2010 |

OTHER PUBLICATIONS

European Search Report dated Oct. 16, 2018.

*Primary Examiner* — Patrick F Brinson
(74) *Attorney, Agent, or Firm* — Sofer & Haroun, LLP

(57) ABSTRACT

Bend restrictor comprising at least one pipe section and at least one clamp section
  wherein the pipe section comprises an outward facing flange at each end, the pipe section is split in the longitudinal direction into at least two parts,
  wherein the clamp section comprises an inward facing flange at each end and a pipe shaped middle section therebetween, wherein the clamp section is split in the longitudinal direction into at least two parts, wherein said parts are connectable through bolt connections, and
  wherein each inward facing flange is adapted to receive the outward facing flange of a pipe section.

12 Claims, 4 Drawing Sheets

(56) References Cited

U.S. PATENT DOCUMENTS

2008/0317555 A1 12/2008 De Aquino et al.
2012/0241037 A1 9/2012 Lund

* cited by examiner

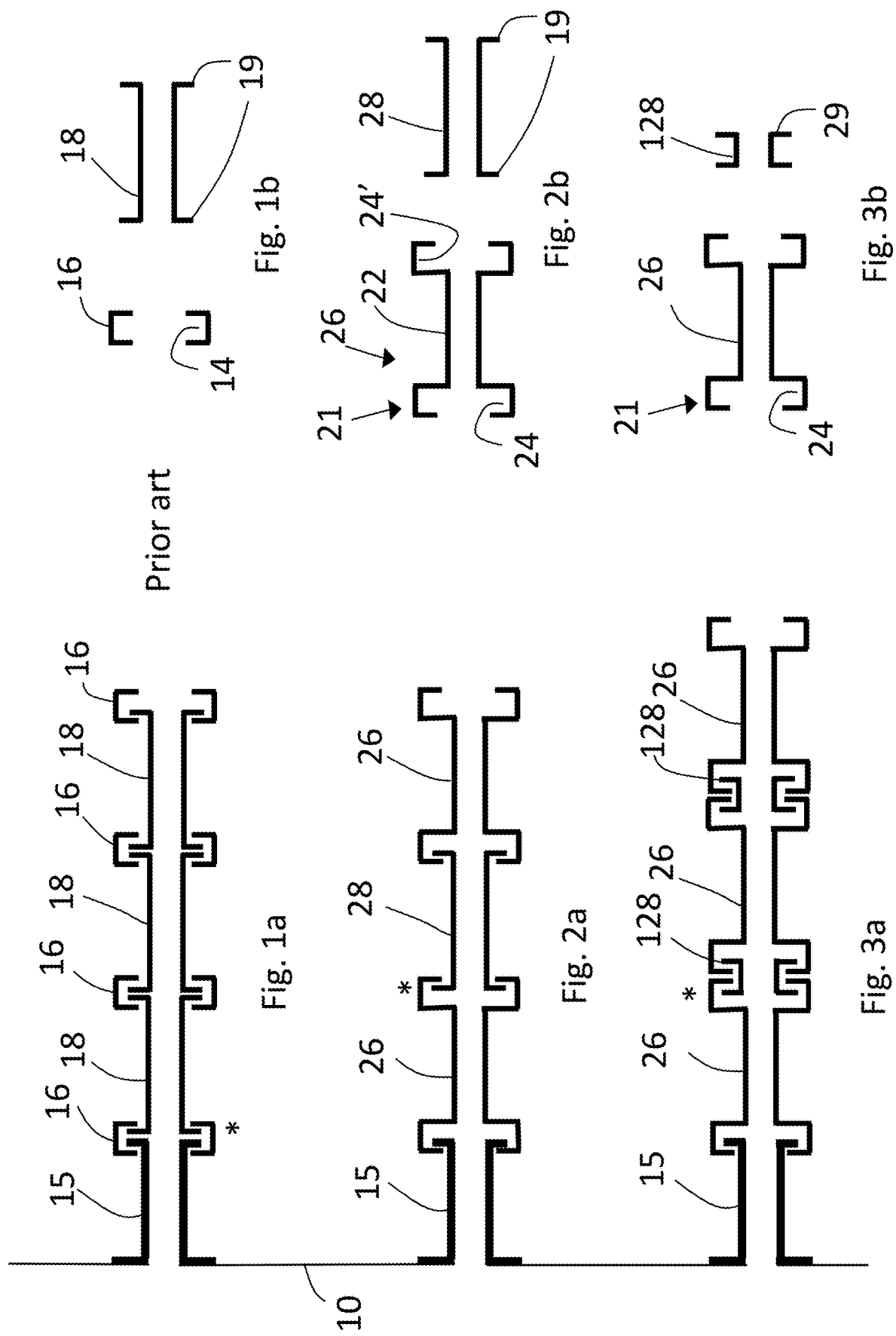

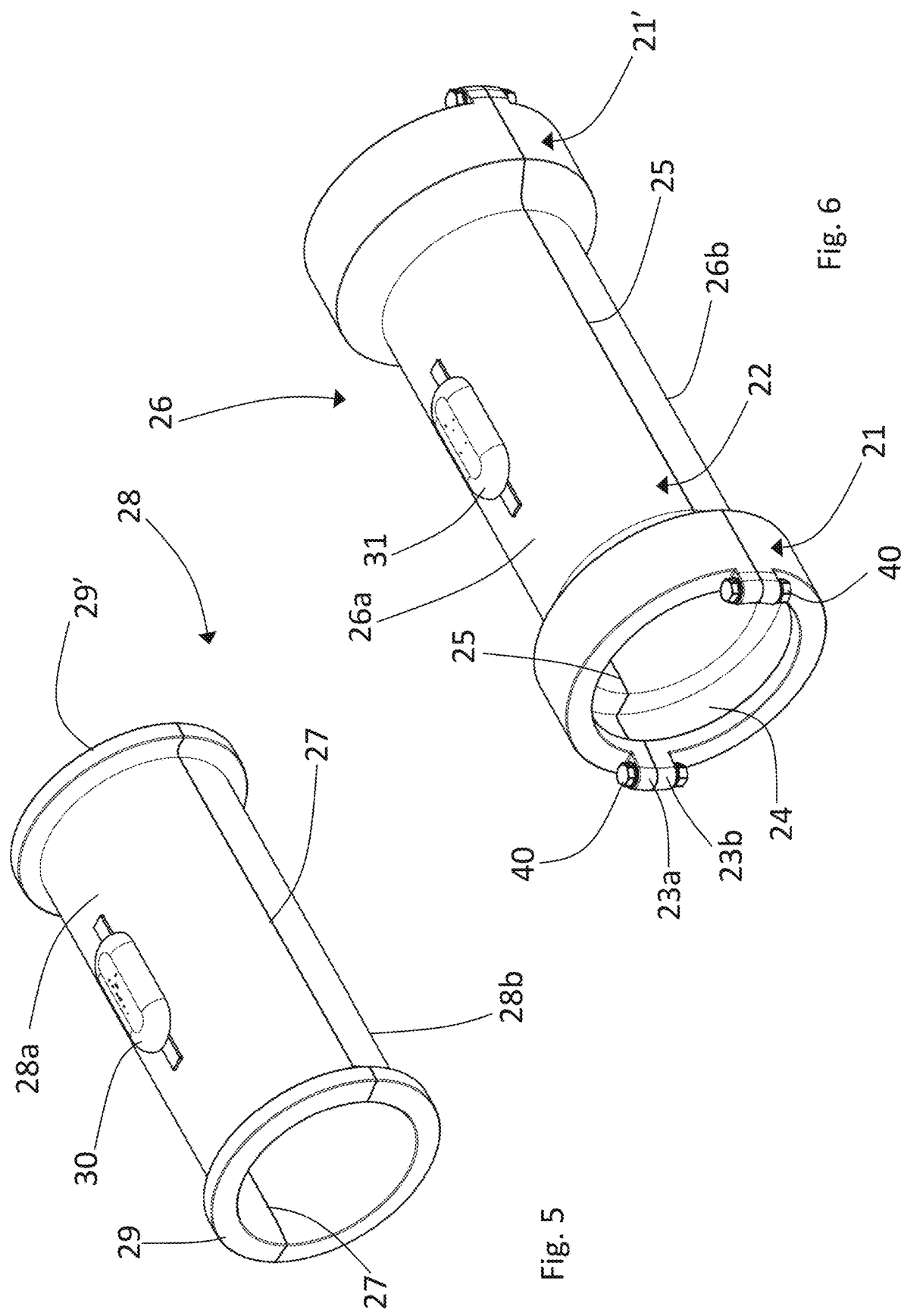

BENDING RESTRICTOR

RELATED APPLICATIONS

This application claims the benefit of priority from European Patent Application EP 18 305 554.0, filed on May 3, 2018, the entirety of which is incorporated by reference.

FIELD OF THE INVENTION

The present invention relates to a bend restrictor, more specifically to a bend restrictor for a cable. The bend restrictor comprises elements made up of at least two parts, such that the bend restrictor may be freely arranged on and removed from any section of a cable without requiring access to a cable end.

BACKGROUND

Bend restrictors are well known appliances for use on a large number of objects such as cables, umbilicals, pipelines, wires etc. and serves the function as evident from the name, to restrict the bending of the object. Cables and umbilicals are produced to tolerate a certain degree of bending, so that they can be spooled and arranged in the intended position or in a flexible arrangement. However, to avoid damages bending beyond the tolerated degree and repeated bending at the same point should be avoided. Especially, where the cable or umbilical is connected to other equipment the risk of damages is high and therefore bend restrictors are arranged in connection with the equipment and extend along the cable or umbilical away from the equipment.

The first sections of the bend restrictor closest to the equipment will often experience the strongest forces.

PRIOR ART

NO320897 discloses a bend restrictor comprising pipe sections consisting of two halves connectable through bolt connections. The pipe sections comprise an outward directed flange at each end of the pipe section. The pipe sections are interconnected by clamps which consist of two halves connectable through bolt connections. The clamps have an inward facing flange adapted to receive the outward facing flange of two adjacent pipe sections. Both the pipe sections and the clamps are split in halves in the longitudinal direction. Each pipe section and each clamp are equipped with sacrificial anodes as they are prepared of metal that would otherwise not withstand humid conditions including subsea installation.

The solution disclosed in NO320897 requires arranging of four bolts in each pipe section and four bolts in each clamp. When bended the strongest forces will be applied to the first clamp connecting the end section and the first pipe section.

OBJECTIVES OF THE INVENTION

An objective of the present invention is to provide a bend restrictor with reduced cost and installation time.

Another objective is to provide a bend restrictor with improved bending moment.

A further objective is to provide a bending restrictor with increased strength near the end section.

The present invention aims at providing a bend restrictor that solves one or more of these objectives.

The present invention provides a bend restrictor comprising at least one pipe section and at least one clamp section wherein the pipe section comprises an outward facing flange at each end, the pipe section is split in the longitudinal direction into at least two parts, wherein the clamp section comprises an inward facing flange at each end and a pipe shaped middle section therebetween, wherein the clamp section is split in the longitudinal direction into at least two parts, wherein said parts are connectable through bolt connections, or through locking pin connections or through straps and wherein each inward facing flange is adapted to receive the outward facing flange of a pipe section.

In one aspect of the invention only the clamp parts are designed to be interconnected through bolt connections whereas the parts of the pipe section are kept in position by the clamp sections. In another aspect the parts of the clamp are connectable and the pipe section parts are connectable through bolt connections, or through locking pin connections or through straps.

The term "connectable through bolt connections, or through locking pin connections or through straps" is used herein to refer to the parts being adapted to be connected to form a single element.

In one aspect of the bend restrictor, the clamp section further comprises bolts, or locking pins or straps such that the parts of the clamp section are connected. In a further aspect the pipe section also further comprises bolts, or locking pins or straps such that the parts of the pipe section are connected.

Each section is split in the longitudinal direction such that the assembly of the bend restrictor may take place in any direction and if required any clamp section can be removed without interfering with the other clamp sections. Thereby providing access to the pipe sections and the cable at any point.

In use the bend restrictor will comprise more than one pipe section interconnected by clamp sections.

In on aspect of the bend restrictor the outer diameter of the pipe shaped middle section of the clamp section is equivalent to the outer diameter of the pipe section between the outward facing flanges. This aspect allows for the installation of identical sacrificial anodes on the pipe sections and the clamp sections. Alternatively, the outer diameter of the pipe shaped middle section of the clamp section is smaller than the outer diameter of the end sections of the clamp section. This reduces the amount of material used to prepare the clamp section.

In a further aspect of the bend restrictor, the clamp section comprises a radial extension at each end, wherein each radial extension comprises the inward facing flange.

In yet another aspect of the bend restrictor according to the invention, the bend restrictor is made of metal and each section, preferably each part, comprises a sacrificial anode. The metal can be steal or another type of metal applicable for the installation environment.

Further, the sacrificial anode(s) of the clamp section can be arranged on the pipe shaped middle section of the clamp section. The outer diameter of pipe shaped middle section the clamp section is smaller than the outer diameter of the radial extensions at each end, and arranging a sacrificial anode on the pipe shaped middle section will not increase the overall diameter of the clamp section and reduces the risk of the sacrificial anode being accidental removed or damaged during handling as it is protected by the radial extensions.

In another aspect of the bend restrictor, the bend restrictor is made of polyurethane (PUR) or, a composite material or any combination of materials such as metal/PUR, composite material/metal, composite material/PUR or metal/PUR/composite material.

In one aspect of the bend restrictor the at least two parts of the clamp section comprises through holes adapted to receive a bolt. Each part may comprise four through holes that are aligned when the parts are brought together to form a clamp section. The at least two parts of the clamp section may comprise axial extending tongues comprising the through holes adapted to receive a bolt. The maximum outer diameter of the clamp section is preferably unchanged by the axial extending tongues.

In yet another aspect of the restrictor, the clamp section has an axial length of 0.2 to 10 times the axial length of the pipe section. Alternatively, the clamp section has an axial length of 0.5 to 5 times the axial length of the pipe section.

In one aspect the clamp section has an axial length of 0.2 to 1.5 times the axial length of the pipe section. Alternatively, the clamp section has an axial length of 0.5 to 1.5 times the axial length of the pipe section.

In another aspect the clamp section has an axial length of 2 to 10 times the axial length of the pipe section. Alternatively, the clamp section has an axial length of 2 to 8 times the axial length of the pipe section. Alternatively, the clamp section has an axial length of 3 to 7 times the axial length of the pipe section.

In a further aspect of the bend restrictor the axial length of the pipe section is adapted to the axial length of the radial extensions of the clamp section, such that when the bend restrictor is in a bend position the radial extensions of two clamp sections connected to the same pipe section are brought in direct, force transferring contact.

In another aspect the parts of the pipe section comprise through holes adapted to receive a bolt. Connecting the pipe section parts using bolts increases the number of elements. The number of possible bolts in the pipe section depends on the function thereof. One bolt connection between the parts could function only as an installation aid and adding limited or no strength to the pipe section.

The present invention provides a solution which reduces the over all number of parts making up the bend restrictor but also reduces the number of different parts. Preferably the number of parts is reduced by 20-50%. This results in a shorter installation time. Fewer parts and fewer different parts reduces the production, shipping and handling costs. It may also make it possible to reduce the amount of material included in the bend restrictor.

The first pipe section of the bend restrictor after the end section is normally a weak element due to the strong bending forces in this area. By utilizing the present invention and including an elongated clamp part, which can be made stronger than the pipe section, the weak element is moved further away from the end section and towards the bend restrictor exit point. By doing this the bending moment at the critical point is reduced by 5-20%, depending on Minimum Bending Radius (MBR) and the clamp length.

The bend restrictor according to the present invention can be installed on cables, wires, pipelines, umbilicals and other similar longitudinal objects. In the following the term cable is used to refer to the object to be protected, and this term should be understood to cover any of the mentioned longitudinal objects.

BRIEF DESCRIPTION OF THE DRAWINGS

The present invention will now be described in further details with reference to the enclosed drawings. A person skilled in the art will appreciate that different features illustrated in different embodiments may be combined to provide further embodiments of the present invention.

FIG. 1a is a schematic cross-sectional view of a prior art bed restrictor.

FIG. 1b illustrates the clamp and the pipe section of the prior art bed restrictor.

FIG. 2a is a schematic cross-sectional view of a first embodiment of the invention.

FIG. 2b illustrates the clamp and the pipe section of the first embodiment of FIG. 2a.

FIG. 3a is a schematic cross-sectional view of a second embodiment of the invention.

FIG. 3b illustrates the clamp and the pipe section of the second embodiment of the bed restrictor.

FIG. 5 illustrates a pipe section according to the first embodiment of the bend restrictor.

FIG. 6 illustrates a clamp according to the first embodiment of the bend restrictor.

PRINCIPAL DESCRIPTION OF THE INVENTION

Figure 4:
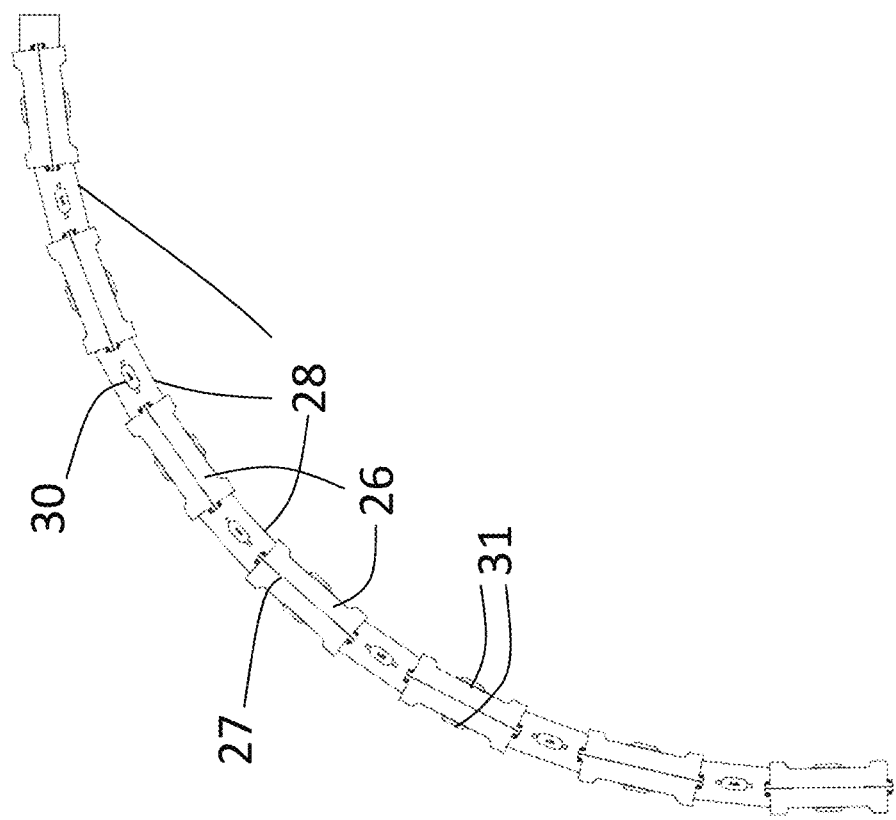
FIG. 4 illustrates a bend restrictor according to the first embodiment.

A prior art bend restrictor is illustrated on FIGS. 1a and 1b. The end section 15 is connected to an equipment wall 10. A pipe section 18 is connected to the end section 15 with a clamp 16. The end section 15 comprises an outward extending flange at the end extending from the equipment wall 10. The pipe section 18 also comprises outward extending flanges 19 at each end thereof. The clamp 16 comprises one inward facing flange 14 adapted to receive the outward facing extending flanges of two pipe sections or the end section 15 and the first pipe section. The cable to be protected by the bend restrictor is not shown in the schematic representation, but the longitudinal open passage therethrough is easily visible. In the schematic illustration it is also not visible that each pipe section and each clamp are longitudinal split in at least two sections. In this prior art solution, the clamps have a very limited contribution to the length of the bend restrictor.

The prior art bend restrictor on FIG. 1a comprises three pipe sections and four clamps. If these are split in half the bend restrictor comprises fourteen pieces. These pieces are, if designed as in NO320897, connected with twenty-eight bolts.

A weak point of the prior art bend restrictor is at the position of the first clamped, marked with an asterisk (*). Three elements are connected at this point. The inward facing flange of the clamp is designed such that a limited movement of the outward flange of the first pipe section in relation to the outward flange of the end section is possible such that a limiting bending of the bend restrictor and the cable arranged therein is made possible. The outward flange of the pipe section at * is often the weakest point of the bend resistor.

FIGS. 2a and 2b illustrate a first embodiment of the present invention using the same schematic method of illustration. The pipe section 28 is similar to the prior art pipe section, in one aspect of the embodiment the pipe sections are split in the longitudinal direction, but assembled without bolt connections or similar elements. Instead the two or more pieces of the pipe section are kept in place by the clamps.

The clamp 26 has a new design. The clamp 26 comprise a longitudinal pipe shaped middle section 22 with a diameter similar to the diameter of the main part of the pipe section 28. At each end the clamp 26 comprises a radial extension 21 with an inward facing flange 24, 24'. Compared to the prior art the bend restrictor of FIG. 2a comprises no point where two pipe sections are directly connected within the same inward facing flange, in that the inward facing flanges are separated by the pipe shaped middle section 22. The effect of the separation is that the weak spot of the prior art solution is removed and the bending forces are distributed between the two ends of the first clamp 26 connected to the end section 15. The position * of the first pipe section flange is moved further away from the equipment wall 10, which increases bending moment capacity.

The design of the clamp further provides for the clamp to contribute considerably to the length of the bend restrictor. The bend restrictor illustrated on figure has a similar length as the prior art bend restrictor of FIG. 1a but comprises considerable less parts. The bend restrictor on FIG. 2a comprises one pipe section and two clamps, which makes six pieces if they are split in two. If only the clamps include bolts, only eight bolts are required for the assembling of the illustrated bend restrictor. The design allows for a reduction from fourteen to six pieces and from 28 to eight bolts. In use the bend restrictor will normally have a considerable greater length and the reduction in number of parts will be even more dramatic.

If the bend restrictor is prepared in steel for installation in moist climate including submerged in water the parts have to be protected from corrosion to obtain a reasonable life span. For this purpose, it is known to install sacrificial anodes on each part or element. In the prior art solution anodes on the external surface of the clamps increases the external diameter of the bend restrictor. Further, due to the difference in outer diameter between the central part of the pipe section and the clamp of the prior art, the curvature of the surface on which the anodes are attached is different and two different types of anodes adapted to the two surface curvatures are required. In the design according to the present invention the outer diameter of the central part of the pipe section is identical to the outer diameter of the middle section of the clamp. Anodes with the same adapted curvature can there be attached to the surface of both types of elements, which simplifies the number of different parts. Additionally, arrangement of the anode on the middle section of the clamp has the effect that the anode does not increase the over all diameter of the bend restrictor and the anode is also less exposed to external forces.

FIGS. 3a and 3b illustrates a second embodiment of the present invention using the same schematic illustration. In this embodiment the clamp 26 is similar to the clamp of FIG. 2a. However, the pipe sections 128 are reduced in length. This embodiment may to some extend limit the number of parts compared to the prior art solution. The solution can be prepared without bolt connections between the parts of the longitudinal split pipe sections. Also, the increase in the bending moment capacity due to movement of the weak point further away from the wall 10 is achieved in this embodiment. With the second embodiment a further increase in bending moment capacity is obtained due to the fact that with this design the radial extending sections 21 of two adjacent clamps 26 can interact directly and transfer compression forces directly between the clamps without interacting with the pipe section 128 connected by the two clamps.

FIG. 4 shows a bend restrictor according to the first embodiment in further detail. In this illustration the bend restrictor is prepared of steel. A number of pipe sections 28 are connected with clamps 28 arranged therebetween. The longitudinal split 27 of the clamp into parts is visible. Sacrificial anodes 31 are arranged on each part. In full electrical contact between the clamp parts can be obtained it will sufficient with one anode on each clamp. Sacrificial anodes 30 are arranged on the surface of the pipe sections 28. In this drawing the longitudinal split in the pipe sections is not visible and therefore only one anode on each pipe section is visible. However, unless full electrical contact between the split parts of the pipe section can be obtained an anode is arranged on each part. The pipe sections can rotate freely when no bending forces are pressing the outward flange against the surface of the inward facing flange of the clamp.

FIG. 5 illustrates a pipe section 28 according to the first embodiment. Here the longitudinal split 27 between the parts 28a and 28b is visible. Outward extending flanges 29 and 29' are arranged at the ends. A sacrificial anode 30 is arranged on the main surface of part 28a. A similar anode is arranged on the part 28b, although not visible in on the drawing.

FIG. 6 illustrates a clamp 26 according to the first embodiment. The clamp 26 is split in the longitudinal direction into two parts 26a and 26b along the line 25. On the surface of the middle section 22 an anode 31 is arranged. The clamp comprises extended sections 21, 21' at each end. Inside the extended section 21 an inward facing flange 24 is arranged. The clamp parts 26a and 26b are kept together by bolts 40. In the disclosed embodiment the bolts 40 are arranged in axial extending tongues 23a, 23b with trough holes. Alternatively, the through holes for arranging the bolts could be arranged within the wall of the extended section.

Figure 7:
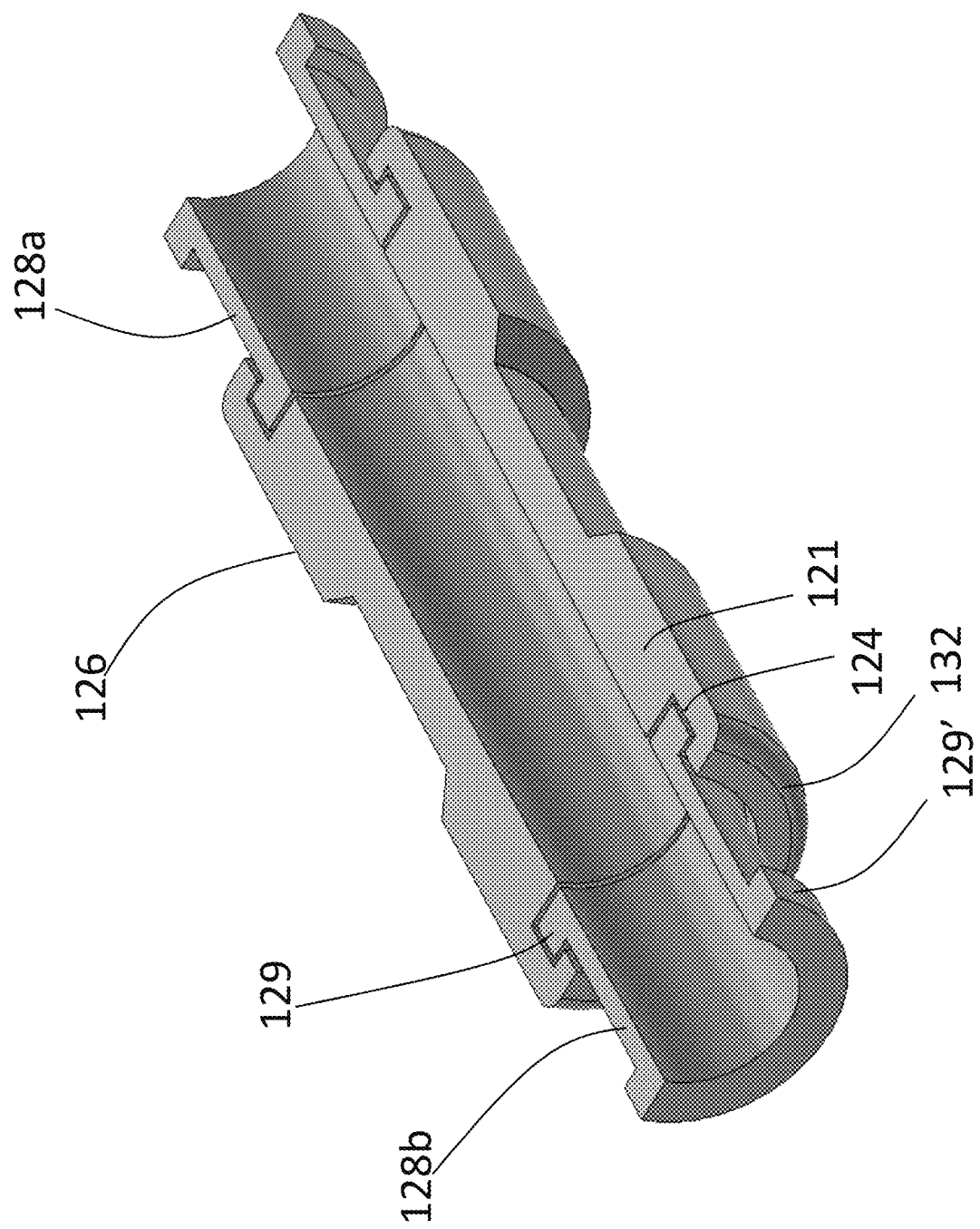
FIG. 7 shows half a bend restrictor according to a third embodiment.

FIG. 7 illustrates a longitudinal split bend restrictor according to the second embodiment of the present invention. The shorter pipe section parts 128a and 128b are arranged at the opposite ends of the clamp part 126. The outward extending flange 129 of pipe section part 128b is arranged within the inward facing flange 124 of the clamp part 126. The illustrated embodiment is preferably made of polyurethane (PUR) or a polymer composite material. Through holes for connecting clamp parts are not shown on FIG. 7 but could be arranged in the extended section 121.

When the bend restrictor is bend the end surface 132 of the clamp part 126 will be brought in contact with the end surface of a clamp section arranged around flange 129'. The bending force is thereby transferred directly from one clamp section to the next section and the force of the pipe section is reduced and possibly eliminated.

The invention claimed is:

1. A bend restrictor comprising:
   at least one pipe section, and at least one clamp section,
   wherein the pipe section comprises an outward facing flange at each end, the pipe section is split in the longitudinal direction into at least two parts,
   wherein the clamp section comprises an inward facing flange at each end and a pipe shaped middle section therebetween, wherein the clamp section is split in the longitudinal direction into at least two parts, wherein said parts are connectable through bolt connections, or through locking pin connections or through straps and
   wherein each inward facing flange is adapted to receive the outward facing flange of a pipe section,
   wherein the at least two parts of the clamp section comprises through holes adapted to receive a bolt, and wherein the at least two parts of the clamp section comprises axial extending tongues comprising the through holes adapted to receive said bolt.

2. The bend restrictor according to claim 1, wherein the outer diameter of the pipe shaped middle section of the clamp section is equivalent to the outer diameter of the pipe section between the outward facing flanges.

3. The bend restrictor according to claim 1, wherein the clamp section comprises a radial extension at each end, wherein each radial extension comprises the inward facing flange.

4. The bend restrictor according to claim 1, wherein the bend restrictor is made of metal and each section, preferably each part, comprises a sacrificial anode.

5. The bend restrictor according to claim 4, wherein the sacrificial anode(s) of the clamp section is arranged on the pipe shaped middle section of the clamp section.

6. The bend restrictor according to claim 1, wherein the bend restrictor is made of PUR or composite material.

7. The bend restrictor according to claim 1, wherein the maximum outer diameter of the clamp section is unchanged by the axial extending tongues.

8. The bend restrictor according to claim 1, wherein the clamp section has an axial length of 0.2 to 10 times the axial length of the pipe section.

9. The bend restrictor according to claim 1, wherein the clamp section has an axial length of 0.2 to 1.5 times the axial length of the pipe section.

10. The bend restrictor according to claim 1, wherein the clamp section has an axial length of 2 to 10 times the axial length of the pipe section.

11. The bend restrictor according to claim 3, wherein the axial length of the pipe section is adapted to the axial length of the radial extensions of the clamp section, such that when the bend restrictor is in a bend position the radial extensions of two clamp sections connected to the same pipe section are brought in direct, force transferring contact.

12. The bend restrictor according to claim 1, wherein the parts of the pipe section comprises through holes adapted to receive a bolt.

* * * * *